Sept. 20, 1955 S. S. McINTYRE 2,718,160
VARIABLE SPEED TRANSMISSION
Filed Oct. 15, 1951 4 Sheets-Sheet 4

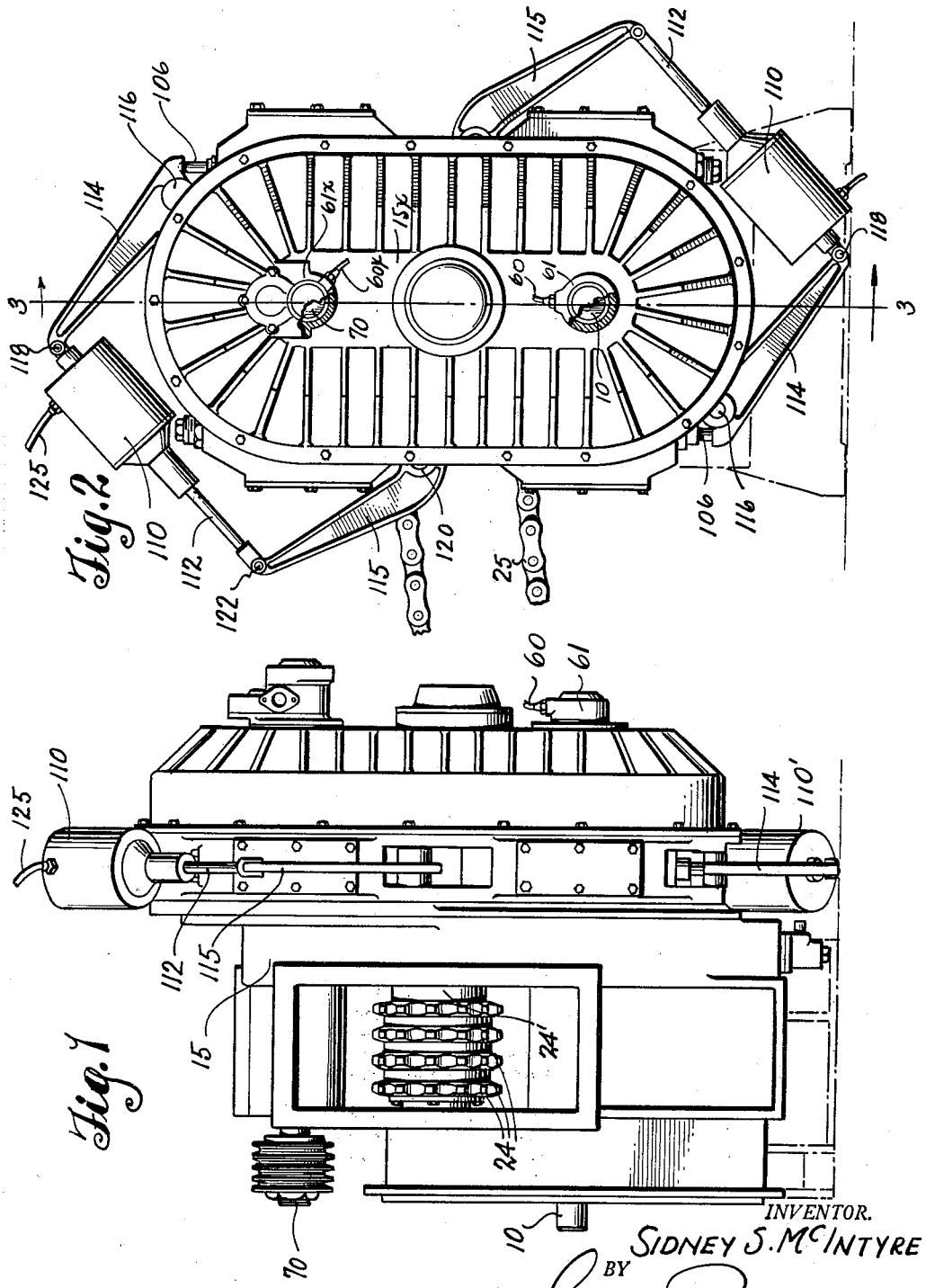

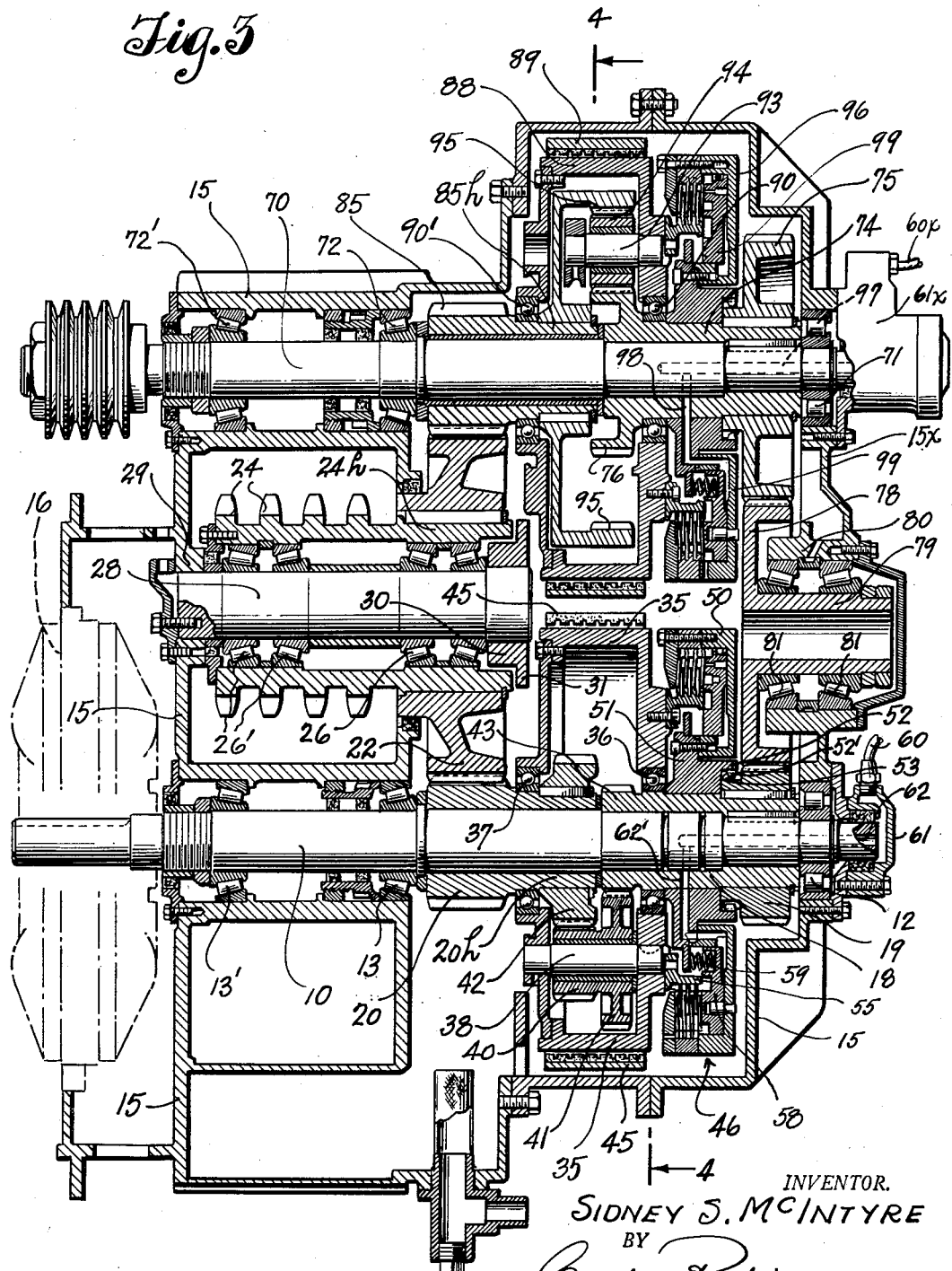

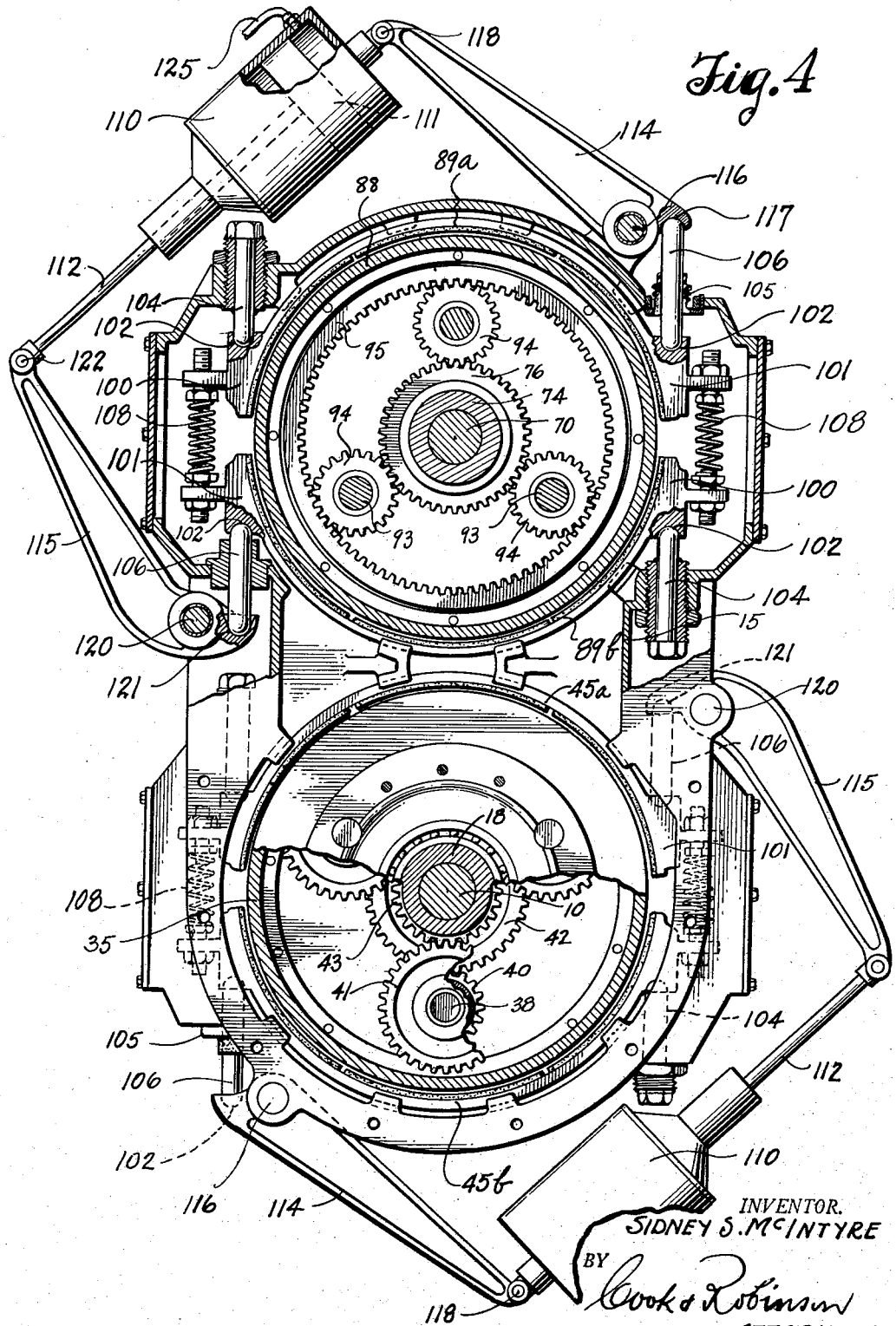

INVENTOR.
SIDNEY S. McINTYRE
BY
Cook & Robinson
ATTORNEYS

United States Patent Office 2,718,160
Patented Sept. 20, 1955

2,718,160

VARIABLE SPEED TRANSMISSION

Sidney S. McIntyre, Sedro Woolley, Wash., assignor to The Humboldt Company, Seattle, Wash., a corporation of Washington Application October 15, 1951, Serial No. 251,306

3 Claims. (Cl. 74—674)

This invention relates to power transmission mechanisms and it has reference more particularly to a selective four speed mechanism designed for use in connection with the power units of log yarders for the driving of the various cable winding drums. The mechanism, however, is not limited in its use to yarders or similar machines, but can be applied likewise to various machines where it is desirable that a speed changing gearing be used in connection with a source of power for the operation of the machine.

It is the principal object of my invention to provide a plural speed power transmission mechanism that is of a more economical character and more practical construction from the standpoint of manufacture, assembly, and upkeep, than transmission mechanisms now generally used for a like purpose and for obtaining a like number of operating speeds; that avoids the use of tubular and coaxially arranged shafts and their expensive and hard to assemble parts; that is especially applicable for use in connection with log yarders and similar heavy duty apparatus where the selective driving of cable winding drums at different speeds is required.

Further objects of the invention reside in the details of construction of the various parts, in their combination and in their mode of operation as will hereinafter be fully described.

In accomplishing these and other objects of the invention, I have provided the improved details of construction, the preferred forms of which are illustrated in the accompanying drawings, wherein—

Fig. 1 is a side view of a power transmission mechanism embodied by the present invention.

Fig. 2 is an end elevation of the same.

Fig. 3 is an enlarged, longitudinal sectional view, taken substantially on the line 3—3 in Fig. 2.

Fig. 4 is a cross-section, taken substantially on the line 4—4 in Fig. 3 and especially illustrating the braking means for the planetary gear systems.

Figure 6:
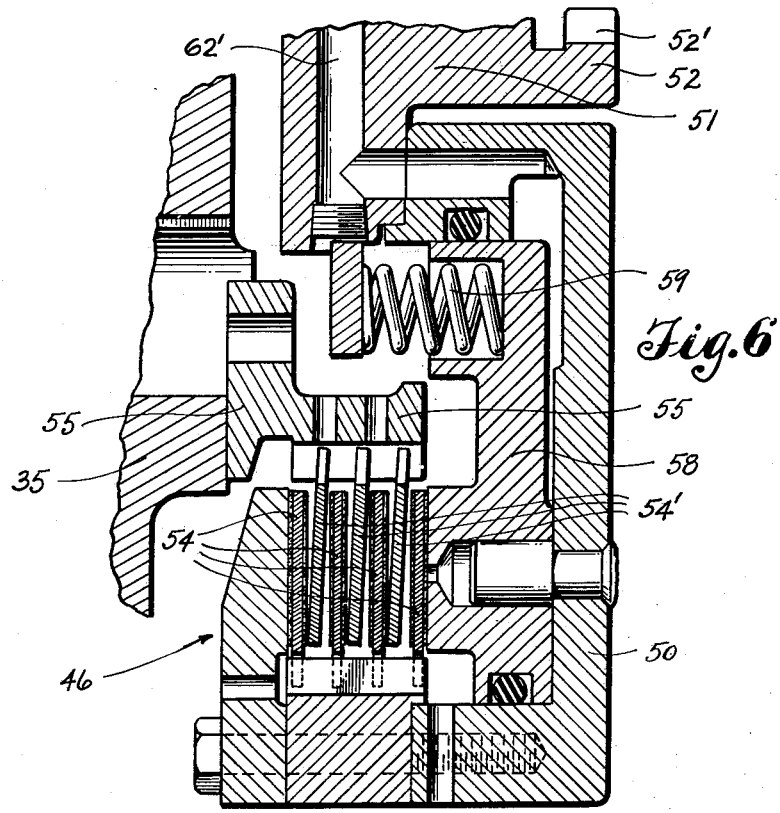
Fig. 6 is an enlarged sectional detail of a portion of a clutch mechanism.

Referring more in detail to the drawings—

As used in connection with a log yarder and engine, the present transmission mechanism can be attached for support directly to the engine housing after the fashion of attaching the transmission mechanism in an automobile to the engine, and its power shaft can be operatively connected to the engine drive shaft through any suitable type of clutch device. It is contemplated, however, that the present transmission mechanism, as used in connection with a log yarder, shall be attached to the engine housing in position for connection of the engine drive shaft with the power mechanism through a hydraulic coupling, and that the engine be mounted parallel with the axes of the cable winding drums of the yarder, and that the yarder drums be driven by a sprocket chain belt connection between the yarder and power output shaft of the transmission mechanism. The exact mode of application or means of effecting the connections between the engine and the transmission mechanism, and from the transmission to the machine is not to be confined to the means herein shown.

The present transmission mechanism, as seen best in Fig. 3, comprises a shaft 10 that is revolubly supported at one end in roller bearings 12, and its opposite end portion is supported in two opposedly related sets of thrust bearings 13—13′; the bearings 12 and 13—13′ being mounted in a transmission gear case or housing which is herein designated in its entirety by numeral 15. The shaft 10, which I will hereinafter refer to as the power shaft of the transmission mechanism, is adapted to be connected to an engine driven shaft, or other suitable source of power by any suitable means. In Fig. 3 of the present drawings, I have designated the connection to be made through a hydraulic coupling 16 which is shown only in dotted lines. Through this coupling an operating connection with the drive shaft of the engine or prime mover can be established or released and also the shaft 10 can be driven at various speeds.

Keyed on the power shaft 10, adjacent the roller bearing 12 is a sleeve 18, and applied about and keyed to that end portion of the sleeve that is adjacent the bearing 12 is a pinion gear 19. Revolubly mounted on the shaft 10, between the inner end of the sleeve 18, and bearing 13, is a pinion gear 20, which at all times is in operative mesh with an idler gear 22 that is mounted on and keyed to a power output shaft 24h which has a plural sprocket wheel 24 integral therewith about which sprocket chain belts 25 are applied for the driving of the machine or apparatus, not herein shown, with which the present apparatus is to be used. The belts 25 are shown in part in Fig. 2.

The power output shaft 24h is tubular and is rather elongated and of substantial diameter, and it is revolubly mounted to turn upon two sets of thrust bearings, 26—26′, which are carried by a coaxially contained supporting shaft 28. Shaft 28, as seen in Fig. 3, is above and is parallel with power shaft 10. It is mounted at its opposite ends in bearings 29 and 30 formed, respectively, in an end wall of the transmission gear housing 15 and a cross member 31 that is secured rigidly in the housing.

The driving of the power output shaft 24h is through the mediacy of the gear 22, that is keyed thereon, and the gear wheel 20, which is freely revoluble on shaft 10. However, in the present arrangement of parts, provision is made for driving the gear 20 from shaft 10 through the functioning of a planetary gear system and a brake mechanism therefor which will now be explained, thus to selectively obtain two different speeds of operation.

It is shown in Fig. 3 that a cylindrical housing 35 is mounted coaxially of and for rotation about the shaft 10. This housing comprises opposite end walls that are formed centrally with coaxially aligned openings in which ball bearings 36 and 37 are fitted to mount the housing 35 for rotation about the sleeve 18 and hub portion 20h of gear 20 and coaxially of shaft 10.

Mounted in the housing 35 to rotate on axles 38 that extend between and are mounted at their ends in the opposite end walls of the housing, are three planetary gear sets, each of which comprises a gear pinion 40 and a somewhat larger gear 41. In the present showing in Fig. 3, only one of these planetary gear sets has been shown; the others having been omitted to avoid confusion in the illustration. The gears 40 are in operative mesh with a sun gear 42 that is keyed on the hub portion 20h of gear 20. The larger gears 41 of the planetary sets are likewise in operative mesh with a gear 43 that is formed integrally with and about the inner end portion of the sleeve 18. Brake bands 45a and 45b are applied to the cylindrical housing 35, as best shown in Fig. 4, and these bands, which are supported in the housing 15, as presently explained in connection with the showing in Fig. 4, can be set to grip and hold the housing 35 against rotation, or they can be released therefrom to permit it to rotate about shaft 10.

In combination with the planetary gear system and the housing 35, I have applied a clutch about shaft 10 between gear 19 and housing 35, as a means for effecting a direct drive between shaft 10 and the housing 35. This clutch, which is designated generally by numeral 46, is of the well known multiple disk type of construction, and it comprises a housing 50 that is rigidly fixed to a clutch collar 51 that is fitted about the sleeve 18 just within the gear 19. Collar 51 is formed with a coaxial, internally toothed annular flange 52, the teeth 52' of which intermesh with gear teeth 53 formed about the hub portion of gear 19. Thus, the housing 50, as supported from the shaft 10 will be caused to revolve with the shaft at all times.

Contained in the housing 50 are the friction disks 54 that are caused to turn therewith. Also, there are those disks 54' that alternate with the driving disks 54 and which are mounted on and are interlocked with an annular band 55 that is secured to the adjacent side wall of the housing 35. Thus, when the clutch disks 54—54' are clamped together, they provide a driving connection from housing 50 to housing 35; the latter then being driven by the shaft 10.

To set the clutch, to effect this driving connection, an annular piston plate 58 is fitted in the cylindrical housing 50 to engage against one end of the disk pack. The plate 58 is yieldingly urged away from the pack to a normally disengaged position, by a plurality of coiled springs 59 that are disposed between the piston plate and the band 55. Air under pressure can be admitted to the housing 50 at the outer side of the piston plate to force it toward the disk pack to set the clutch for rotatably driving the case 35 of the planetary gear system with the shaft 10.

In the present showing in Fig. 3, air under pressure is supplied from a suitable source of supply through a pipe line 60 to a hollow cap 61 that is applied to housing 15 in an air tight connection over the end of shaft 10. The shaft is formed with an axial bore 62 leading from the cap inwardly to the location of collar 51 and then a radial bore 62' leads therefrom through the sleeve 18, collar 51 and into housing 50. Admittance of air to and from the clutch housing is under control of a hand valve as shown in connection with Fig. 5, and later described.

Assuming the various parts as so far described to be so assembled, it will be understood that when the brake band segments 45 are released from housing 35, and the clutch 46 is set, the housing 35 will be caused to rotate in unison with shaft 10 and the sleeve 18. By reason of the planetary gears 41 being in mesh with gear 43 on sleeve 18, and by reason of the housing 35 being held by the clutch disks against rotation relative to the sleeve 18, the planetary gears 40—41 will be held against turning on their axles 38. Therefore, the gears 40 will cause the gear 42 to turn with the housing 35 and thus turn the gear 20 in unison with shaft 10.

The gear 20 drives the gear 22 that is keyed on the power output shaft 24h. Therefore, the rate of turning of the sprocket 24 relative to the rate of turning of shaft 10 will be dependent upon the relative diameters of the gears 20 and 22. In the present instance the gear 20 is about one-third the diameter of gear 22. Therefore, sprocket 24 will rotate at one-third the speed of the shaft 10.

If the clutch should be disengaged and the brake band segments 45 set in a manner to hold the housing 35 and planetary gears therein against turning about the shaft 10, then the gear 43 at the inner end of sleeve 18 will drive the planetary gear sets 40—41 and through them drive the gear 42 and gear 20. The reduction in speed of the sprocket wheel 24 then is in accordance with the reduction provided through the train of gears 43—41—40—42—20 and 22. Through the use of the mechanism as so far described, two operating speeds are provided for the sprocket wheels 24.

In connection with the use of the previously described parts, and others now to be described there is provided another forward speed and a reverse drive. To accomplish these results, a countershaft 70 is mounted in the upper portion of housing 15, parallel to shaft 10 and revolubly supported at one end in roller bearings 71 and at its other end in oppposedly related thrust bearings 72—72'.

Keyed on shaft 70, just within bearing 71, is a sleeve 74, and keyed on the outer end of this is a gear 75. Formed on the inner end of sleeve 74 is a gear 76. Gear 75 is aligned with the gear 19 as mounted on shaft 10 and it is adapted to be driven through the mediacy of an idler gear wheel 78 that has a hub portion 79 revolubly supported in a bearing 80 formed in a side wall 15x of housing 15. The hub 79 is rotatably supported by two sets of oppposedly related thrust bearings 81—81 as well shown in Fig. 3. Thus, the countershaft 70 will be driven by and in the same direction as powershaft 10, and at a relative speed that is governed by the diameters of the gears 19 and 75. In the present showing gear 19 is one-half the diameter of gear 75 and thus shaft 70 will be driven from shaft 10 at one-half the speed of shaft 10.

Freely revoluble on countershaft 70, just within the bearings 72, is a gear 85 which is in constant mesh with the idler gear wheel 22. The gear 75 and gear 85 are adapted to be inter-connected so as to provide a forward driving speed and a reverse driving of sprocket 24. For the accomplishment of these results, I employ a clutch, brake and planetary gear system substantially like that previously described, except as required to give the reverse driving action through the planetary gearing.

The planetary gear system as seen in Fig. 3 comprises a cylindrical gear housing 88, about which brake band segments 89a—89b are applied. The housing 88, is mounted for rotation coaxially of shaft 70 and it is supported by bearings 90—90' which are mounted on the sleeve 74 and on hub 85h of the gear 85, respectively. Formed on the inner end of the sleeve 74 is the gear 76 which constitutes the central or sun gear of a planetary gear system as associated with shaft 70. Supported on three stub shafts 93 that are fixed in an end wall of housing 88, at intervals equally spaced from and about the shaft 70, are the planetary gears 94, which mesh with the central gear 76, and also with an enclosing internal ring gear 95 that is supported as seen in Fig. 3 to rotate with the hub portion 85h of gear 85 coaxial of the shaft 70.

Associated with this planetary gear system is a clutch, designated in its entirety by numeral 96, and comprising friction disks and parts corresponding to those of the clutch 46 previously described and adapted to be similarly operated by the application of air under pressure, admitted under valve control through connections as presently explained. Operating air is admitted through an axial bore 97 in shaft 70, to a radial bore 98 leading to the clutch housing. A piston plate 99 in the clutch housing is acted on by admitted air to effect the setting of the clutch to cause the rotation of housing 88 with housing 96. Operating air, in this instance, is admitted to a cap 61x applied to housing wall plate 15x over the end of shaft 70, through a pressure line 60x. The means for applying air for the clutch and brake operation will presently be described.

Assuming these parts to be so constructed and assembled, it is quite apparent that the driving of countershaft 70 by gear 75 through gear 78 will be coincident to the driving of power shaft 10 and in the same direction but at one-half its speed, due to the gear 75 being twice the diameter of the gear 19. Also, sprocket 24 is adapted to be driven by gear 22 through gear 85 either in a forward direction at one speed or in a reverse direction, depending upon the particular setting of the brake 89 and clutch 96. For example, if the clutch 96 is set and the brake band 89 is released, the housing 88 of the planetary system will rotate with shaft 70 and provide a direct driving connection between shaft 70 and gear 85 and will thus drive the sprocket 24 in a forward direction at a speed that is slower than that provided through the gearing associated with shaft 10 because of the ratio of gears 19 and 75.

If the clutch 96 is disengaged and the brake band 89 is set to hold the housing 88 against rotation, then the direction of turning of gear 85 is reversed through the planetary system and its rate of turning based upon ratios of gears of the system.

Means for the control of the brakes as used with the two planetary systems is shown in Fig. 4, wherein it is disclosed that the lower brake comprises two substantially semi-circular brake shoes 45a and 45b, and the upper brake comprises substantially semi-circular shoes 89a and 89b movably supported for application and release. The two brake structures are alike, and therefore the following description directed to one will apply equally to the other.

Each of the brake band segments 89a and 89b is equipped at its opposite ends with lugs 100 and 101, and each of these lugs is formed with a semi-spherical socket 102. Mounted in the housing 15 which encloses the braking mechanisms are adjustably fixed pivot studs 104, each for holding one end of the paired segments. The studs 104 have their inner ends seated in the sockets 102 of the lugs 100. Also, mounted in guides 105 supported in the housings are push pins 106 which at their inner ends seat pivotally in the sockets 102 of the lugs 101. The lugs 100 and 101 of paired band segments are urged apart, thus to disengage the cylindrical housings about which they are applied, by coiled springs 108 that are mounted under compression between the lugs.

To apply the braking pressure I employ an air cylinder 110, containing a piston 111 from which a piston rod 112 extends. Mounted pivotally in the housing 15 at opposite sides of the brake drum, are lever arms 114 and 115. Lever 114 is mounted, near one end, on a pivot bolt 116 and has a socket 117 adjacent the pivot, that faces the socket 102 in the lug 101 of band 89a, and which socket seats the outer end of the corresponding push pin 106 therein. At its outer end, the lever is pivotally attached to the end of the air cylinder, as at 118. The lever 115 is pivotally mounted near one end on a pivot pin 120 and has a socket 121 near the pivot that seats the outer end of the corresponding push pin 106 therein. The outer end of lever 115 is pivotally connected to the outer end of the piston rod 112 as at 122.

Air under pressure is admitted to the end of the cylinder to extend the piston rod, through a conduit 125. When the piston rod is extended, the outer ends of the lever arms 114—115 are pushed apart and thus the push pins 106, as engaged with the coacting brake band segments, operate to clamp the brake band segments against the drum 88 about which it is applied. When air pressure is exhausted from the cylinders, the springs 108 urge the band segments away from the drum and the drum is then free to rotate.

Figure 5:
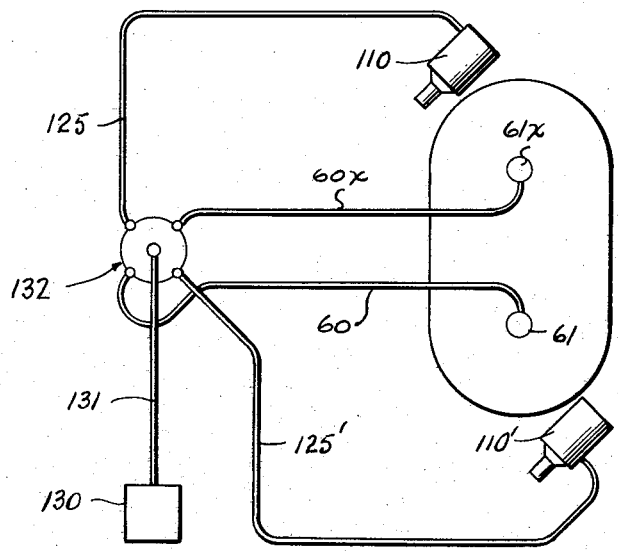
Fig. 5 is a view diagrammatically showing the pneumatic control system for the operation of the brakes used with the apparatus.

In Fig. 5 I have, in a rather diagrammatic way shown the pneumatic control system. In this view 130 designates a source of air under pressure, connected by pipe line 131 with a four way valve 132. Pipe lines 125 and 125' lead from the valve housing to the two cylinders 110—110' and lines 60 and 60x lead to the air caps 61 and 61x for application of air to the two clutches.

The valve 132 is of a construction which provides for a selective application of operating air to either clutch and either brake, and the release of air from the parts not being held.

It is to be here explained that in the event a reverse drive is not desired, then the planetary gear system as associated with shaft 70 would be in accordance with that here shown as associated with shaft 10. In that case a four speed forward would be provided.

The present arrangement of parts provides a compact, serviceable unit, that can be easily and readily assembled or disassembled. It is relatively inexpensive, long wearing and easy to operate.

Various gear ratios may be employed to meet requirements.

Having thus described my invention what I claim as new therein and desire to secure by Letters Patent, is—

1. In a speed changing and power transmission system a power output shaft equipped with a driving gear, a power shaft having selective driving connections with said gear through which it can be directly driven and a countershaft continuously driven from the power shaft at a reduced speed, a sleeve revolubly fitted to the driven shaft and formed with a pinion gear in mesh with said driving gear of the power output shaft, a planetary gear system associated with said driven shaft and comprising a central gear fixed on the driven shaft, a ring gear revoluble about the central gear and keyed to said sleeve, a drum housing revoluble about the ring gear and planetary gears mounted on spindles are fixed in said drum housing and meshing both with the said central gear and the ring gear, a releasable clutch mechanism associated with the driven shaft and drum housing, operable, when set, to lock the drum for rotation with the driven shaft to cause rotation of the ring gear therewith to drive the sleeve in unison with the driven shaft, and a brake for the drum housing operable, when said clutch is released, to hold the drum housing against rotation and cause reverse driving of the ring gear and sleeve by the central gear through the planetary gears.

2. A speed changing power transmission system comprising a power shaft, a power output shaft, a countershaft, gearing providing a positive, reduced speed driving connection between said power shaft and said countershaft, a sleeve revoluble on the power shaft, a sleeve revoluble on the countershaft, a driving gear on the power output shaft, gear wheels fixed on said sleeves in constant driving mesh with the driving gear of the power output shaft, a planetary gear system associated with the power shaft and the sleeve thereon and having a central gear of one diameter keyed on the power shaft and another central gear of larger diameter keyed on the sleeve, a set of planetary gears fixed coaxially together and meshing separately with the said central gears, a brake drum revoluble about the power shaft and mounting the said planetary gears, a brake for holding the drum against rotation, a clutch adapted to be set when the brake is released to provide a driving connection between power shaft and drum, another planetary gear system associated with the countershaft and sleeve thereon comprising an outer gear mounted by the sleeve to rotate it, a central gear keyed on the countershaft, a brake drum revoluble about the countershaft and planetary gears mounted by the drum in mesh with the central gear and outer gear, a brake for holding the drum against rotation, and a clutch adapted to be set when the brake is released to cause the drum to rotate with the countershaft.

3. In a speed changing power transmission system; a power shaft with a pinion gear fixed thereon, a power output shaft with a driving gear fixed thereon, and a countershaft; a sleeve revolubly fitted to the power shaft and having a pinion gear thereon, a sleeve revolubly fitted on the countershaft and having a pinion gear thereon, the pinion gears of both sleeves meshing with the driving gear of the power output shaft, a geared connection between the power shaft and countershaft whereby the latter is driven at a reduced speed and in the same direction, a planetary gear system associated with the power shaft and comprising a central gear fixed on the sleeve applied to that shaft, a drum housing revoluble about the power shaft and a plurality of planetary gear sets mounted thereby; each gear set comprising a pinion gear meshing with the said central gear and a larger gear rotatable therewith and meshing with the pinion gear that is fixed on the power shaft, a releasable clutch mechanism operable, when set, to effect a driving connection between the main drive shaft and drum housing, a brake for the drum housing operable when the clutch is released, to hold the housing against rotation and effect driving of the power output shaft at a reduced speed through the planetary gear system, a planetary gear system associated with the countershaft and comprising a central gear fixed on the countershaft, a ring gear revoluble about the central gear and keyed to said sleeve applied to the countershaft, a drum housing revoluble about the said ring gear, planetary gears mounted on spindles that are fixed in said drum housing, and meshing both with the central gear and the ring gear, a releasable clutch mechanism operable, when set, to lock the drum housing for rotation with the said countershaft, to drive the sleeve in unison with the countershaft, and a brake for the drum housing operable, when said clutch is released, to hold the drum housing against rotation and cause reverse driving of the ring gear and its mounting sleeve by the central gear through the planetary gears.

References Cited in the file of this patent

UNITED STATES PATENTS

| | | |
|---|---|---|
| 474,328 | Mower | May 3, 1892 |
| 696,285 | Vrard et al. | Mar. 25, 1902 |
| 802,175 | Seeley et al. | Oct. 17, 1905 |
| 1,274,781 | Rathbun | Aug. 6, 1918 |

FOREIGN PATENTS

| | | |
|---|---|---|
| 918,636 | France | Feb. 13, 1947 |
| 967,113 | France | Oct. 26, 1950 |
| 669,354 | Germany | Dec. 23, 1938 |